United States Patent [19]

Ohkawa

[11] Patent Number: 4,710,339
[45] Date of Patent: Dec. 1, 1987

[54] ION CYCLOTRON RANGE OF FREQUENCIES HEATING OF PLASMA WITH SMALL IMPURITY PRODUCTION

[75] Inventor: Tihiro Ohkawa, La Jolla, Calif.

[73] Assignee: The United States of America as represented by the United States Department of Energy, Washington, D.C.

[21] Appl. No.: 645,031

[22] Filed: Aug. 27, 1984

[51] Int. Cl.$^4$ .............................................. G21B 1/00
[52] U.S. Cl. .................................... 376/123; 376/132
[58] Field of Search ............... 376/121, 123, 131, 132, 376/133

[56] References Cited

U.S. PATENT DOCUMENTS

| | | | |
|---|---|---|---|
| 2,920,236 | 1/1960 | Chambers et al. | 376/123 |
| 3,015,618 | 1/1962 | Stix | 376/123 |
| 3,090,737 | 5/1963 | Swartz | 376/123 |
| 3,160,566 | 12/1964 | Dandl et al. | 376/123 |
| 3,257,283 | 6/1966 | Hamberger | 376/123 |
| 4,110,595 | 8/1978 | Brambilla et al. | 376/132 |
| 4,115,190 | 9/1978 | Clarke | 376/123 |
| 4,263,097 | 4/1981 | Ohkawa | 376/123 |
| 4,292,124 | 9/1981 | Fisch | 376/123 |
| 4,423,001 | 12/1983 | Fisch | 376/123 |
| 4,425,295 | 1/1984 | Fisch et al. | 376/123 |

OTHER PUBLICATIONS

Stix, T. H., The Theory of Plasma Waves, p. 162 (McGraw–Hill, New York, 1962).
Hosea, J., et al., PLT Ion Cyclotron Range of Frequencies Heating Program, paper presented at 4th Joint Varenna–Grenoble International Symposium on Heating in Toroidal Plasmas (Rome, Mar. 1984).
Odajima, K., et al., Second Harmonic ICRF Heating Experiment in the JFT-2M Tokamak, paper presented at the 4th Joint Varenna–Grenoble International Symposium on Heating in Toroidal Plasmas (Rome, Mar. 1984).

Primary Examiner—Deborah L. Kyle
Assistant Examiner—Richard L. Klein
Attorney, Agent, or Firm—Fitch, Even, Tabin & Flannery

[57] ABSTRACT

Plasma including plasma ions is magnetically confined by a magnetic field. The plasma has a defined outer surface and is intersected by resonance surfaces of respective common ion cyclotron frequency of a predetermined species of plasma ions moving in the magnetic field. A radio frequency source provides radio frequency power at a radio frequency corresponding to the ion cyclotron frequency of the predetermined species of plasma ions moving in the field at a respective said resonance surface. RF launchers coupled to the radio frequency source radiate radio frequency energy at the resonance frequency onto the respective resonance surface within the plasma from a plurality of locations located outside the plasma at such respective distances from the intersections of the respective resonance surface and the defined outer surface and at such relative phases that the resulting interference pattern provides substantially null net radio frequency energy over regions near and including substantial portions of the intersections relative to the radio frequency energy provided thereby at other portions of the respective resonance surface within the plasma.

4 Claims, 4 Drawing Figures

ION CYCLOTRON RANGE OF FREQUENCIES HEATING OF PLASMA WITH SMALL IMPURITY PRODUCTION

BACKGROUND OF THE INVENTION

This invention relates to the ion cyclotron range of frequencies (ICRF) heating of plasma with small impurity production. More particularly it relates to the application of an ICRF launcher for providing minimum heating at the edge of the plasma.

Plasma devices, such as those intended for fusion devices, require high temperature plasmas, that is, plasmas including ions moving at relatively high velocity. To achieve such high velocities, energy must be imparted to the ions. One such method of imparting energy is ICRF heating of ions confined in the plasma. In such method, radio frequency (RF) energy is applied at a frequency at which the ions resonate and acquire energy from the applied RF waves.

In toroidal plasma devices ions are constrained by magnetic fields to move in toroidal orbits, hence confining the plasma ions. In such devices a toroidal magnetic field is generated in which the plasma ions follow magnetic lines of flux around the torus. The magnetic lines of flux are twisted to provide equilibrium conditions, but in general the ions spiral around the lines of flux with characteristic periods dependent upon the magnetic field strength and the mass and charge of the ions. It may be assumed that the mass and charge of the species of ions of interest remains constant; however, it is a characteristic of toroidal magnetic fields that magnetic field intensity be stronger toward the major axis of the torus. The consequence of this is that the periods of the ions vary, depending upon their radial displacement from such major axis; hence, the resonant frequency of the ions, the ion cyclotron frequency, varies radially. This results in surfaces substantially circularly cylindrical about tne major axis on which surfaces ions have the same respective ion cyclotron frequency. The surfaces are known as resonance surfaces.

In ICRF heating RF energy is applied at one such radio frequency, usually a frequency for which the resonant surface for the corresponding ion cyclotron frequency intersects the most flux surfaces, a flux surface being a surface of uniform amplitude of magnetic flux. The power of the RF wave is selectively absorbed by the plasma ions at the surface corresponding to such frequency. Here the Doppler shifted phase velocity of the RF wave becomes zero; see, for example, T. H. Stix, The Theory of Plasma Waves, p. 162 (McGraw-Hill, New York, 1962). Typical frequencies for ions of interest are 25 MHz to 60 MHz.

A difficulty with such ICRF heating has been that the level of impurity ions in the plasma has increased dramatically at high ICRF heating power. See J. Hosea et al., PLT Ion Cyclotron Range of Frequencies Heating Program, paper presented at 4th Joint Varenna-Grenoble International Symposium on Heating in Toroidal Plasmas (Rome, March 1984) and K. Odajima, et al., Second Harmonic ICRF Heating Experiment in the JFT—2M Tokamak, ibid.

SUMMARY OF THE INVENTION

The present invention is based upon the realization that the increase in impurities in prior ICRF heating at high power has been caused by the high energy ions on the outer surface of the plasma striking the limiters defining such outer surface or striking the wall of the device. The hot ions interact with the limiters or wall and generate impurity ions by sputtering. These high energy ions were produced by the ICRF heating of ions at the intersection of the respective resonance surface and the outer plasma surface defined by the limiters. The limiters could be moved inwardly to eliminate these heated zones, but this would simply transfer the intersection of the resonance surface and the outer flux surface inward; the ions heated at the intersection would still strike the limiters.

According to the present invention, the RF energy is applied by launchers (antennas) in an interference pattern whereby the RF energy is at a null at the intersections of the respective resonance surface and the outer (limited) flux surface. The heating of the ions is thus effected substantially only at the central region of the plasma, spaced from the limiters and wall. This is achieved by applying RF waves corresponding to the same respective ion cyclotron frequency at spaced locations at phases that result in a null at such intersections. The RF energy can be supplied from discrete RF launcher elements (discrete antennas) or from a composite launcher.

It is thus a primary aspect of the present invention to provide ICRF heating of plasma with relatively small generation of impurities. It is a further aspect to provide RF launchers for heating such plasma at a corresponding resonance surface thereof. It is a further aspect to provide such launchers having a radiation pattern whereby interference between RF waves from respective launchers results in nulls at the intersections of the resonance surface and the outer surface of the plasma. Other aspects, objects and advantages of the present invention will become apparent from the following detailed description, particularly when taken in conjunction with the accompanying drawings.

DETAILED DESCRIPTION

Figure 1:
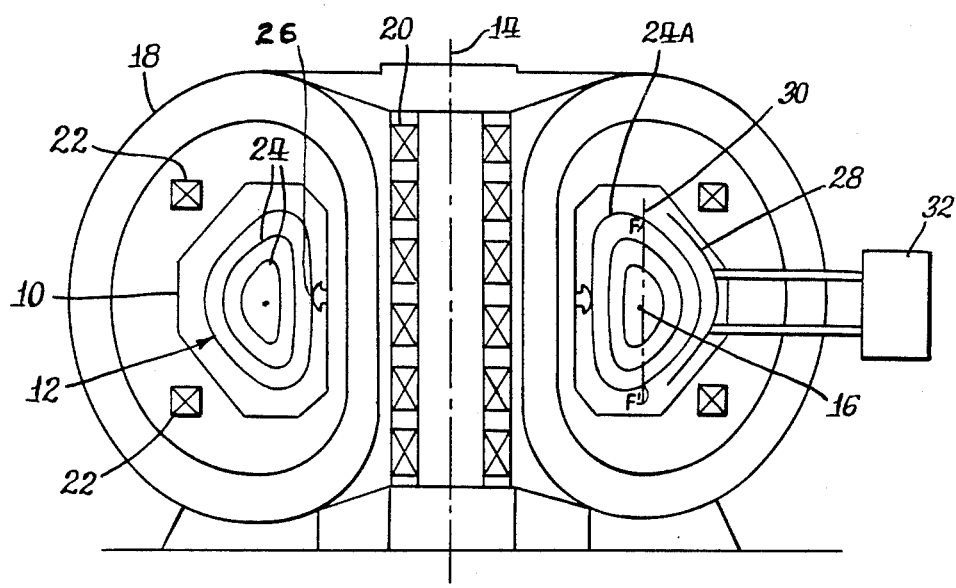
FIG. 1 is an axial cross-sectional view of a toroidal plasma device utilizing ICRF heating in accordance with the present invention.

In FIG. 1 is illustrated a typical toroidal plasma device to which ICRF heating has been applied according to the present invention. Such toroidal plasma devices have been well developed for fusion devices. Such devices include a vessel 10 for confining gas that is ionized to form the plasma 12. The vessel 10 and plasma 12 are toroidal, having a major axis 14 and a minor axis 16. They are substantially circularly symmetrical about the major axis 14.

A toroidal field coil 18 is wound toroidally about the vessel 10 and is supplied with electrical power from a power supply not shown to generate a toroidal magnetic field permeating the vessel 10 and extending in the direction of the minor axis 16. A solenoid coil 20 is disposed about the major axis 14 centrally of the vessel 10 and is supplied with power from a power supply not shown to create an electric field within the vessel 10 wherein the gas acts like the secondary of a transformer. The gas is ionized by such electric field to form the plasma 12, and the plasma ions are driven thereby. The current in such secondary operates to heat the plasma by ohmic heating, and generates a poloidal magnetic field around the minor axis 16. Additional field coils 22 function in conjunction with the solenoid coil 20 to provide appropriate equilibrium magnetic fields. The combination of the various magnetic fields produces a number of closed and nested magnetic flux surfaces 24. The ions in the plasma are constrained by the net field to move generally along such surfaces and are thereby confined. The plasma volume is defined by limiters 26 which act to stop ions that move on flux surfaces leading to the limiters. The last surface free of the limiters 26 is an outer flux surface 24A defining the outer limit of the plasma 12.

The device as thus far described is typical of a number of toroidal plasma devices. In accordance with the present invention a particular ICRF launcher array 28 is provided inside the vessel 10 to heat the plasma 12 with minimum heating of the plasma in the region of the outer flux surface 24A. The launcher array is supplied with RF power from a source 32 and radiates RF power into the plasma 12. The launcher array 28 is designed to provide an interference pattern cancelling the RF field in a certain region of the outer flux surface 24A. As stated above, for each frequency there is a resonance surface. The different resonance surfaces are occasioned by the decrease in magnetic field intensity in going outwardly from the major axis 14. For the particular device illustrated in FIG. 1, a resonance surface 30 exists for the particular frequency of the launcher array 28 which intersects the outer flux surface 24A at circles F and F' (being shown in cross section as respective points).

In order to illustrate the underlying concepts of the invention, reference will be made to the simplified system shown in FIG. 2. As there shown, the ICRF launcher array 28 is formed of three launchers (discrete antennas) 28a, 28b and 28c symmetrically disposed relative to the equatorial plane $x=0$. The wavelength of the ICRF is much larger than the cross-sectional dimension of the plasma 12, and the field distribution can be assumed to be that of a dc field. The vector potential $\vec{A}$ is given by $$\vec{A} = \frac{\mu_0 I}{4\pi r} \vec{l} \tag{1}$$

where $l$ is the length of the launcher, $I$ is the current of the launcher, $\mu_0$ is permeability of vacuum, and $r$ is the distance between an observation point and the launcher location, $r$ being much larger than $l$.

Figure 2:
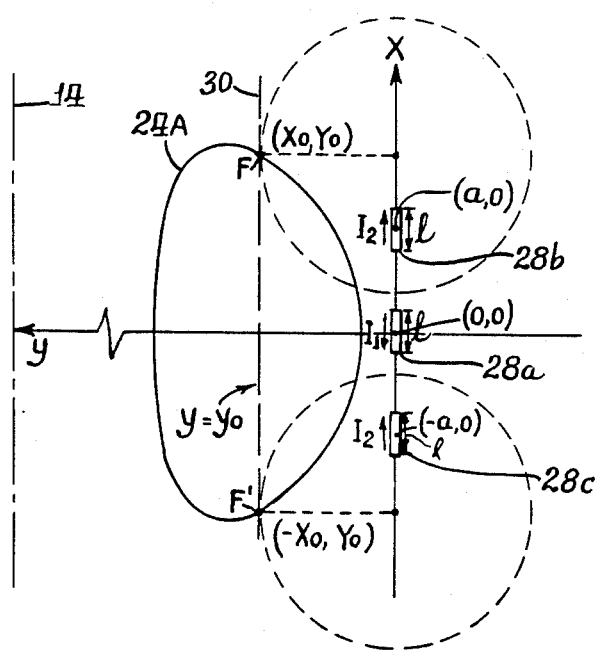
FIG. 2 is a simplified axial cross-sectional view of a toroidal plasma with ICRF launchers for heating it in accordance with the present invention.

As shown in FIG. 2, a launcher 28a is placed at $x=0$, $y=0$, $z=0$ and another launcher 28b at $x=a$, $y=0$, $z=0$, with both launchers having the same length. The combined vector potential is given by $$\vec{A} = |\vec{A}| = \frac{\mu_0 l}{4\pi} \left[ \frac{I_1}{(x^2 + y^2 + z^2)^{\frac{1}{2}}} - \frac{I_2}{[(x-a)^2 + y^2 + z^2]^{\frac{1}{2}}} \right] \tag{2}$$

where $I_1$ is the current of the launcher 23a and $-I_2$ is the current of the launcher 28b. The surface where $\vec{A}=0$ can be determined by simple algebra:

$$\left[ x - \frac{a(I_1/I_2)^2}{(I_1/I_2)^2 - 1} \right]^2 + y^2 + z^2 = \frac{a^2(I_1/I_2)^2}{[(I_1/I_2)^2 - 1]^2} \tag{3}$$

If $I_1 > I_2$, the surface is a sphere of radius $a(I_1/I_2)[(I_1/I_2)^2-1]^{-1}$, the center of which is located at $x=a(I_1/I_2)^2[(I_1/I_2)^2-1]^{-1}$, $y=0$, $z=0$. In the surface of the sphere, the electric field due to the RF wave, $E=i\omega A$, where $\omega$ is the frequency in radians, goes to zero because of interference between the waves from the two sources 28a and 28b.

The resonance surface 30 ($y=y_0$) and the outer flux surface 24A intersect at $x=x_0$. The condition that the spherical surface be tangent to the resonance surface at $x=x_0$ is given by $$I_1/I_2 = x_0/y_0 \tag{4}$$

$$a = \frac{[(I_1/I_2)^2 - 1]x_0}{(I_1/I_2)^2} \tag{5}$$

In this case, the magnetic field due to the RF wave, $B = \delta A/\delta x$, also goes to zero. The RF power, which is given by the product of E and B, therefore can be reduced near the resonance circles, F and F'.

Equation (4) illustrates an advantage for this concept when the plasma cross section is noncircular. $x_0$ is essentially the half height of the plasma and $y_0$ is the half width. The elongation ratio $\kappa$ is defined as $\kappa = x_0/y_0$. The power required in the compensating launcher is proportional to $I^2_2 = (I_1/\kappa)^2$. Thus, the required power in the compensating launcher 28b decreases as $1/\kappa^2$.

The above analysis is based on the assumption that r is much larger than $\simeq$. Because $r \simeq r_1$ (plasma minor radius) and the launcher length l can be taken as smaller than $r_1$, the above results are approximately correct.

Because there are two intersections between the flux surface 24A and the resonance surface 30, another launcher 28c is placed at $x=-a$ with the current $-I_2$, as shown in FIG. 2. In this case, the vector potential is given by $$A = |\vec{A}| = \frac{\mu_0 l I_1}{4\pi} \left[ \frac{1}{(x^2 + y^2 + z^2)^{\frac{1}{2}}} - \frac{I_2/I_1}{[(x-a)^2 + y^2 + z^2]^{\frac{1}{2}}} - \frac{I_2/I_1}{[(x+a)^2 + y^2 + z^2]^{\frac{1}{2}}} \right] \tag{6}$$

One can set $A=0$ and $\delta A/\delta x=0$ at $x=x_0$, $y=y_0$ and $z=0$. The previous result, Equations (4) and (5), can be applied approximately because the contribution from the furthest launcher is relatively small.

While the conditions which satisfy $A = \delta A/\delta x = 0$ just at the resonance circles, F and F', are obtained, the net RF fields are also considerably decreased in the neighborhoods of these points. The width of the region of relative null in the z-axis direction is roughly $x_0$. Since heating power is proportional to the square of the vector potential, the edge heating is greatly reduced.

With the plasma conducting current, the field distribution is modified. Further, account may be taken of the plasma dielectric in refining the equation. However, inasmuch as the exact sizes and locations of the respective launchers are not entirely critical and the frequencies, phases and current magnitudes can be adjusted after emplacement, the final system operation can be empirically determined following the precepts of this invention substantially in accordance with the general equations set forth above. The final distance $x_0$ can also be adjusted empirically. In any event launchers 28a, 28b and 28c may be designed, emplaced and fed with RF power of such strength and phase as to provide interference patterns wherein the net power absorbed at the flux surface 24A is substantially zero over a substantial region, hence reducing the ICRF heating of the plasma edge.

Figure 3:
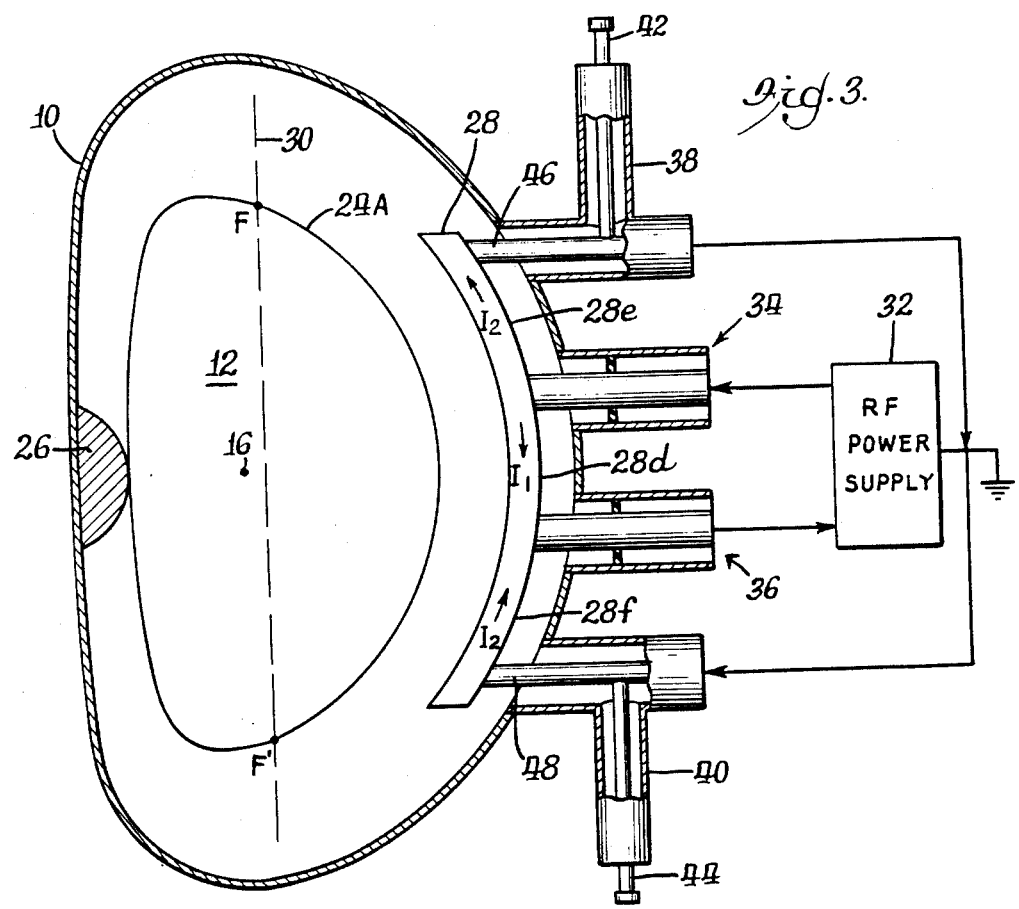
FIG. 3 is an enlarged axial sectional view, partly diagrammatic, of the device shown in FIG. 1.

FIG. 3 illustrates a preferred embodiment of the invention wherein the launcher array 28 is a composite of three launchers 28d, 28e and 28f. It is thus a composite antenna. The central launcher 28d is supplied with power from a suitable RF source 32 of the center-grounded push-pull type through power conductors 34 and 36, which may be coaxial cables. The compensating launchers 28e and 28f are supplied with power from the same source 32 by way of respective reactive tuning elements 38 and 40 and shorted tuning stubs 42 and 44 which adjust the amplitude and phase of the currents $I_2$ in the launchers 28e and 28f relative to the current $I_1$ in the launcher 28e. Power conductors 46 and 48, which may be coaxial cables, may be used for connecting the tuning elements to the respective launchers.

Although particular preferred embodiments of the present invention have been illustrated, various modifications thereof may be made within the scope of the invention. For example, the limiter 26 is shown on the inner edge of the plasma. It is so shown mostly for ease of illustration. In practice the limiters are generally placed on the outer edge of the plasma.

Figure 4:
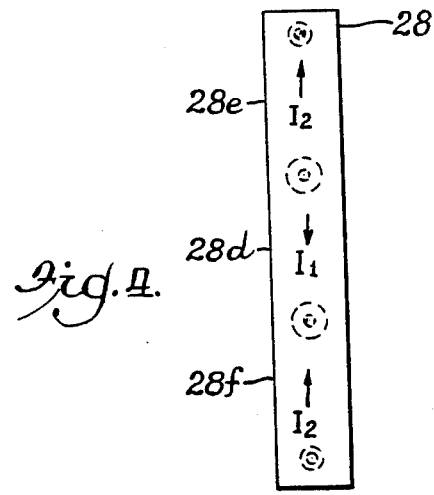
FIG. 4 is a radially outward view of the launchers shown in FIG. 3.

The launcher array 28 may take a number of forms. The shape may be substantially as illustrated in FIGS. 3 and 4. On the other hand, the array may be shaped to extend further around the torus and thereby extend the region of relative null. More than one launcher array 28 may be used, preferably equally spaced around the major axis 14. In general the array will be shorter than the minor diameter of the plasma, but of the same order of magnitude. The lengths of the individual launchers 28a, 28b, 28c, 28d, 28e and 28f should be of such size relative to the minor radius of the plasma and provide resonant frequencies such that there is near zone interference producing a region of relative null extending over substantial portions of the intersections of the respective resonance surface 30 and the outer surface 24A of the plasma, such as about 30° in toroidal angle. The launcher array 28 may be made directional so as to confine the radiation to the portion of the plasma over which the null region occurs and thereby not heat the intersection of the resonance surface 30 and the outer plasma surface 24A outside such region. The RF energy will not pass across the major axis of the torus, being stopped by the walls of the vessel 10. The relative phases as well as the relative positions of the launchers may be modified to place the interference pattern in an optimum position.

What is claimed is:

1. In a plasma device having plasma including plasma ions magnetically confined by a magnetic field, wherein the plasma has a defined outer surface and is intersected by resonance surfaces of respective common ion cyclotron frequency of a predetermined species of plasma ions moving in said magnetic field, an apparatus for ion cyclotron range of frequencies heating of said plasma comprising radio frequency source means for providing radio frequency power at a radio frequency corresponding to the ion cyclotron frequency of said predetermined species of plasma ions moving in said field at a respective said resonance surface, and launching means coupled to said radio frequency source means for radiating radio frequency energy at said radio frequency onto said respective said resonance surface within said plama simultaneously from a plurality of locations located outside said plasma at such respective distances from the intersections of said respective resonance surface and said defined outer surface and at such relative phases that the resulting interference pattern provides substantially null net radio frequency energy over regions near and including substantial portions of said intersections relative to the radio frequency energy provided thereby at other portions of said respective resonance surface within said plasma.

2. Apparatus according to claim 1 wherein said plasma is toroidal with a major axis and a minor axis defining an equatorial plane and is confined in a toroidal vessel by a magnetic field of intensity decreasing radially outward from said major axis to provide respective said resonance surfaces intersecting said defined outer surface substantially at two circles, and said launching means comprises a first launcher disposed within said vessel substantially on the equatorial plane of said toroidal plasma and a pair of compensating launchers disposed within said vessel symmetrically on opposite sides of said equatorial plane, the respective locations of said launchers relative to said circles and the relative phases of the radio frequency energy launched therefrom providing an interference pattern providing substantially null net frequency energy over a substantial portion of each of said circles, said portion being that nearest said launchers.

3. A method for ion cyclotron range of frequencies heating of plasma including plasma ions magnetically confined by a magnetic field, wherein the plasma has a defined outer surface and is intersected by resonance surfaces of respective common ion cyclotron frequency of a predetermined species of plasma ions moving in said magnetic field, said method comprising providing radio frequency energy at a radio frequency corresponding to the ion cyclotron frequency of said predetermined species of plasma ions moving in said field at a respective said resonance surface, and radiating said radio frequency energy at said radio frequency onto said respective said resonance surface within said plasma simultaneously from a plurality of locations located outside said plasma at such respective distances from the intersections of said respective resonance surface and said defined outer surface and at such relative phases that the resulting interference pattern provides substantially null net radio frequency energy over regions near and including substantial portions of said intersections relative to the radio frequency energy provided thereby at other portions of said respective resonance surface within said plasma.

4. A method for ion cyclotron range of frequencies heating of plasma comprising generating a plasma including plasma ions, magnetically confining said plasma by a magnetic field, wherein the plasma has a defined outer surface and is intersected by resonance surfaces of respective common ion cyclotron frequency of a predetermined species of plasma ions moving in said magnetic field, providing radio frequency energy at a radio frequency corresponding to the ion cyclotron frequency of said predetermined species of plasma ions moving in said field at a respective said resonance surface, and radiating said radio frequency energy at said radio frequency onto said respective said resonance surface within said plasma simultaneously from a plurality of locations located within said plasma at such respective distances from the intersections of said respective resonance surface and said defined outer surface and at such relative phases that the resulting interference pattern provides substantially null net radio frequency energy over regions near and including substantial portions of said intersections relative to the radio frequency energy provided thereby at other portions of said respective resonance surface within said plasma.

* * * * *

UNITED STATES PATENT AND TRADEMARK OFFICE
CERTIFICATE OF CORRECTION

PATENT NO. : 4,710,339
DATED : December 1, 1987
INVENTOR(S) : Tihiro Ohkawa

It is certified that error appears in the above-identified patent and that said Letters Patent is hereby corrected as shown below:

Column 1, line 39, change "tne" to --the--.

Column 3, line 53, change "1" to --$\ell$--;

Column 3, line 56, change "1" to --$\ell$--.

Column 4, line 38, change "≃", first occurrence, to --$\ell$--;

Column 4, line 39, change "1" to --$\ell$--;

Column 4, line 61, change "widtn" to --width--.

Signed and Sealed this

Twenty-fourth Day of May, 1988

Attest:

DONALD J. QUIGG

Attesting Officer

Commissioner of Patents and Trademarks